Patented May 26, 1931

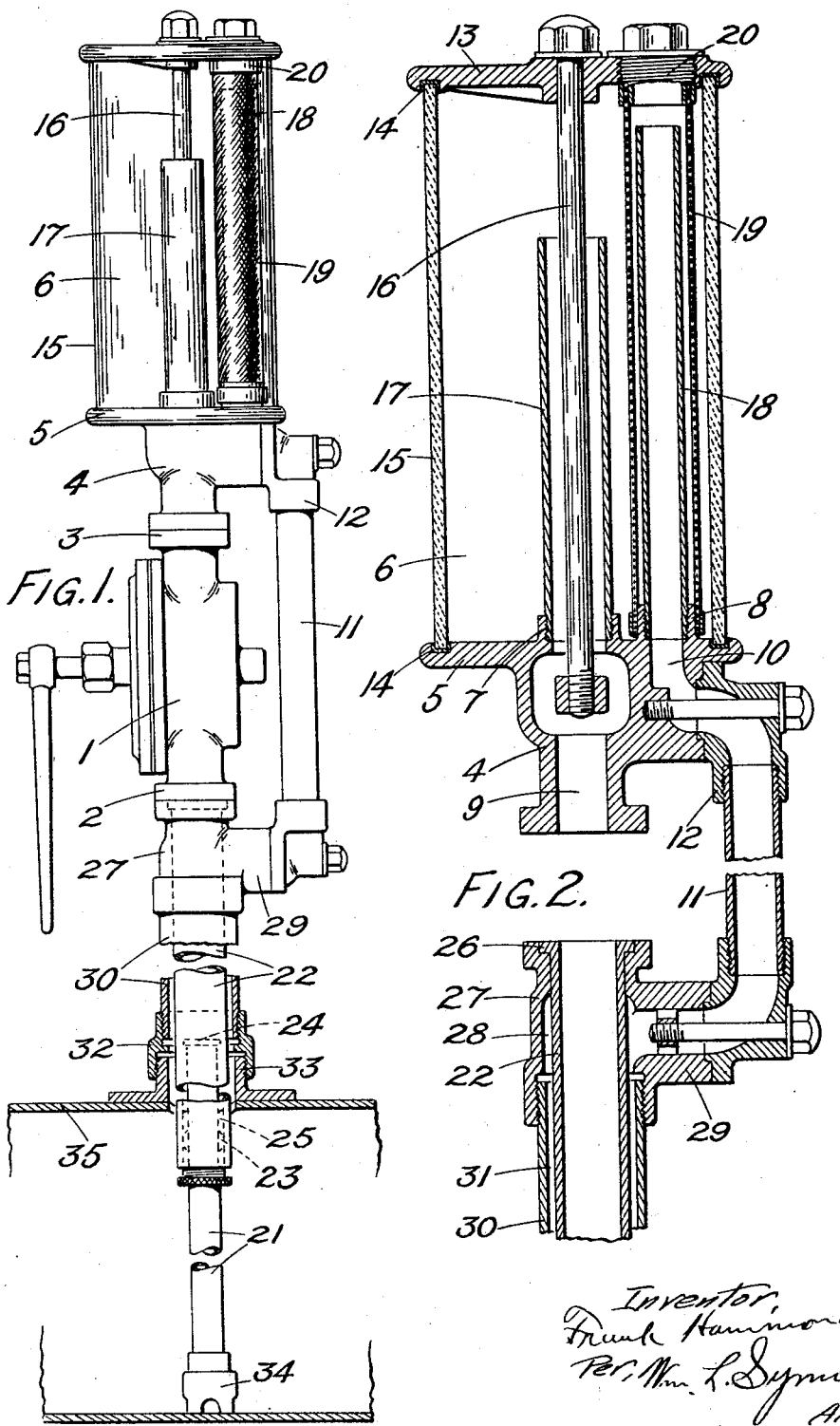

1,806,681

UNITED STATES PATENT OFFICE

FRANK HAMMOND, OF PARK ROYAL, ENGLAND

MEANS FOR CLEANING LIQUID STORAGE TANKS AND THE LIKE

Application filed July 11, 1929, Serial No. 377,586, and in Great Britain October 15, 1928.

This invention relates to means for cleaning liquid storage tanks and the like and particularly for separating impurities from the lower layers of liquid contained in such tanks.

The invention is applicable to underground or above ground storage tanks for petrol and the like whereby accumulated water and suspended solid matter may be readily removed from said tanks. It is to be understood however that the invention is not so limited, and that it is applicable to tanks employed for other liquids.

According to the present invention means for cleaning liquid storage tanks and the like comprises means to withdraw the liquid from the tank, such for example, as a pump having its suction inlet connected with a pipe to be inserted into the tank and its discharge in connection with a vessel having also an outlet for fluid, said vessel constituting means to separate impurities from the liquid withdrawn from the tank.

Thus the vessel may constitute a trap chamber with its outlet disposed above the bottom and preferably above the inlet and a filter may be provided between the inlet and the outlet of said vessel.

The outlet may be constituted by a tube extending into the vessel and the filter may be of cylindrical form surrounding said tube.

Preferably the outlet from the vessel is connected to a return pipe to the tank so that the liquid is pumped from the tank through the cleaning apparaus and the cleaned liquid is returned to the tank.

It is a feature of the present invention that the apparatus for cleaning liquid storage tanks has no connection with the atmosphere, means being provided for sealing the suction and return pipes into the storage tank for the purpose of forming a closed system.

According to a further feature of the invention the suction pipe is telescopic and it may be mounted in an outer tube connected to the outlet from the trap chamber and adapted to be connected to the tank.

One form of the present invention for use with a petrol storage tank will now be described with reference to the accompanying drawings wherein:—

Fig. 1 shows a side elevation partly in section, and

Fig. 2 shows a similar view in section and to a larger scale, of the trap chamber with the pump omitted.

1 is a hand operated pump having a flanged suction inlet 2 at the bottom and a flanged discharge outlet 3 at the top. On said flanged discharge outlet 3 is mounted a casting 4 part of which, 5, constitutes the base of a trap chamber 6. Said base has on its top face two internally threaded bosses 7, 8, one of which, 7, is preferably central. A passage 9 through the casting 4 connects the pump discharge with the central boss 7, and a second passage 10 connects the other boss 8 with a pipe 11 screwed in a third and downwardly directed boss 12 at one side of the casting 4. The top of the trap chamber consists of a plate 13 and both the base 5 and the top 13 have grooves 14, 14 on their adjacent faces to constitute seatings for the opposite ends of a cylindrical wall 15 of glass or other transparent material. The top 13 and base 5 are clamped together by a central bolt 16 which passes through the boss 7. A tube 17 extending a little more than half way up the chamber 6 is screwed at its lower end into the central boss 7 and constitutes the inlet to the chamber from the pump 1. A second and longer tube 18, that is, extending nearly to the top of the chamber 6 is screwed at its lower end into the boss 8 and constitutes the outlet from the chamber. Said outlet tube 18 is surrounded by a cylindrical filter 19, which may be of gauge or other material, carried on a plug 20 inserted into the top of the trap chamber or positioned by the plug engaging its upper end. The lower end of the filter 19 surrounds and engages the boss 8. The filter is easily removable for cleaning.

The suction inlet of the pump is connected with a telescopic suction pipe to be inserted into the tank to be cleaned. Said pipe is in two parts with the inner part 21 telescoping into the outer part 22 through a gland 23. The inner end of the inner part 21 is provided with a ring 24 which in its lowest position engages a ring 25 secured within the outer part 22. The outer part has at its upper end a ring or shoulder 26 by which it is supported in a second casting 27 secured to the flanged suction inlet 2 of the pump. Said casting is of a form to provide a passage 28 surrounding the outer part 22 and connected with a boss 29 to which is secured the pipe 11 extending from the third boss 12 on the first casting 4. The outlet from the trap chamber is thus connected to the passage 28 surrounding the telescopic suction pipe. An outer tube 30 is screwed into the lower end of the second casting 27 and surrounds and is spaced from the outer part 22 as shown at 31. The outer tube 30 carries at its lower end an internally threaded boss 32 to engage the standard tank filler cap screw 33. A slotted member 34 is secured to the end of the inner part 21. 35 indicates the tank.

In use the inner part 21 of the telescopic suction pipe is pulled out and said pipe is inserted into the tank 35 to be cleaned so that the slotted member 34 rests on the bottom. The apparatus is then lowered to allow the boss 32 on the outer tube 30 to be secured to the filler cap screw 33. The pump 1 is operated and the liquid in the lower part of the tank is thus delivered to the trap chamber 6 wherein it flows through the filter 19 to the outlet tube 18 and thence through the pipe 11 to the return passage 31 between the outer part 22 of the suction pipe and the outer tube 30 to the tank 35.

In passing through the trap chamber solid material and liquid of greater specific gravity, such as water which may have entered the tank 35, is collected in the lower part of the trap chamber. A draincock (not shown) is connected into the base of the trap chamber for the removal of such water and solid material which are readily seen through the glass wall 15. The apparatus provides a completely closed system, the liquid being removed from the storage tank, cleaned and returned thereto without coming into contact with the atmosphere.

The invention provides means for readily cleaning tanks which are inaccessible, such as underground tanks for petrol or tanks which are not constructed so as to be cleaned by the ordinary methods of internal cleaning and draining.

It will be understood that various modifications may be made without departing from the invention. For example, the pump may be mounted at the side of the trap chamber on a casting which constitutes the base of the trap chamber and has a duct through it to connect the suction inlet of the pump with the suction pipe. The pump discharge may be delivered into the top of the trap chamber through a downwardly depending tube but such an arrangement is not preferred as the liquid entering the trap chamber will disturb that already present. The outlet from the trap chamber may be connected with a ferrule casting mounted on the suction pipe so as to slide thereon and said casting be provided with clamping means such as a set screw and also with a boss to engage the standard tank filler cap screw.

What I claim is:—

1. For removing impurities from liquid stored in tanks, a self-contained cleaning device comprising pump means, a suction pipe connected to the pump suction and adapted to be inserted into a tank, a separating vessel to separate impurities from the liquid withdrawn from the tank, a connection between the inlet to said vessel and the pump discharge, a return pipe from the outlet from said vessel adapted to be connected to the tank, the suction and return pipes being arranged one within the other, and sealing means on the outer of said pipes for making a tight connection with the tank to form a completely closed system.

2. For removing impurities from liquid stored in tanks, a self-contained cleaning device comprising pump means, a suction pipe connected to the pump suction and adapted to be inserted into a tank, a trap chamber to separate impurities from the liquid withdrawn from the tank, a connection between the inlet to the trap chamber and the pump discharge an outlet for separated fluid disposed above the inlet, a return pipe from said outlet adapted to be connected to the tank, the suction and return pipes being arranged one within the other, and sealing means on the outer of said pipes for making a tight connection with the tank to form a completely closed system.

3. For removing impurities from liquid stored in tanks, a self-contained cleaning device comprising pump means, a suction pipe connected to the pump suction and adapted to be inserted into a tank, a separating vessel to separate impurities from the liquid withdrawn from the tank, a connection between the inlet to said vessel and the pump discharge, a return pipe from the outlet from said vessel adapted to be connected to the tank, a filter in the vessel between the inlet and outlet, the suction and return pipes being arranged one within the other, and sealing means on the outer of said pipes for making a tight connection with the tank to form a completely closed system.

4. For removing impurities from liquid stored in tanks, a self-contained cleaning device comprising pump means, a suction pipe connected to the pump suction and adapted to be inserted into a tank, a trap chamber to separate impurities from the liquid withdrawn from the tank, a connection between the inlet to the trap chamber and the pump discharge an outlet for separated fluid constituted by a tube extending upwards into the trap chamber, a return pipe from said outlet adapted to be connected to the tank, a tubular filter surrounding the outlet tube, the suction and return pipes being arranged one within the other, and sealing means on the outer of said pipes for making a tight connection with the tank to form a completely closed system.

Dated this 21st day of June, 1929.

FRANK HAMMOND.